March 3, 1942.  R. F. JAMES  2,274,964
APPARATUS AND METHOD FOR RESURFACING BEARINGS
Filed Dec. 15, 1936  2 Sheets-Sheet 1
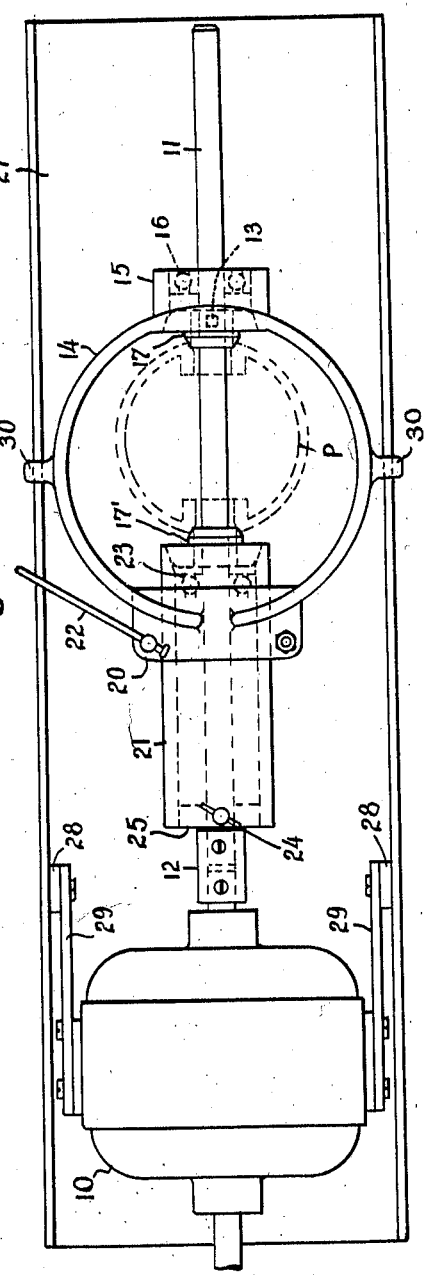
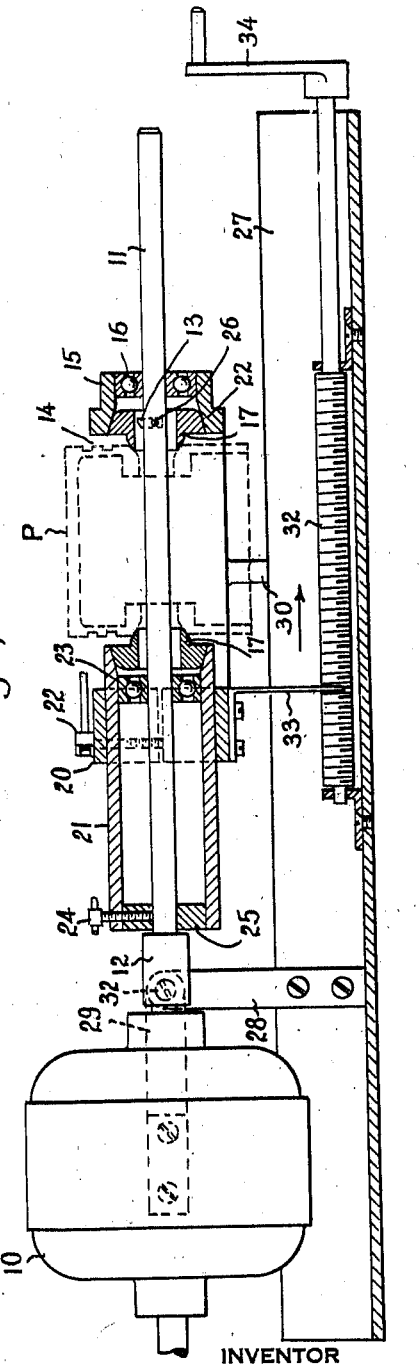
INVENTOR
RUSSELL FREMONT JAMES
BY
ATTORNEYS March 3, 1942. R. F. JAMES 2,274,964
APPARATUS AND METHOD FOR RESURFACING BEARINGS
Filed Dec. 15, 1936  2 Sheets-Sheet 2
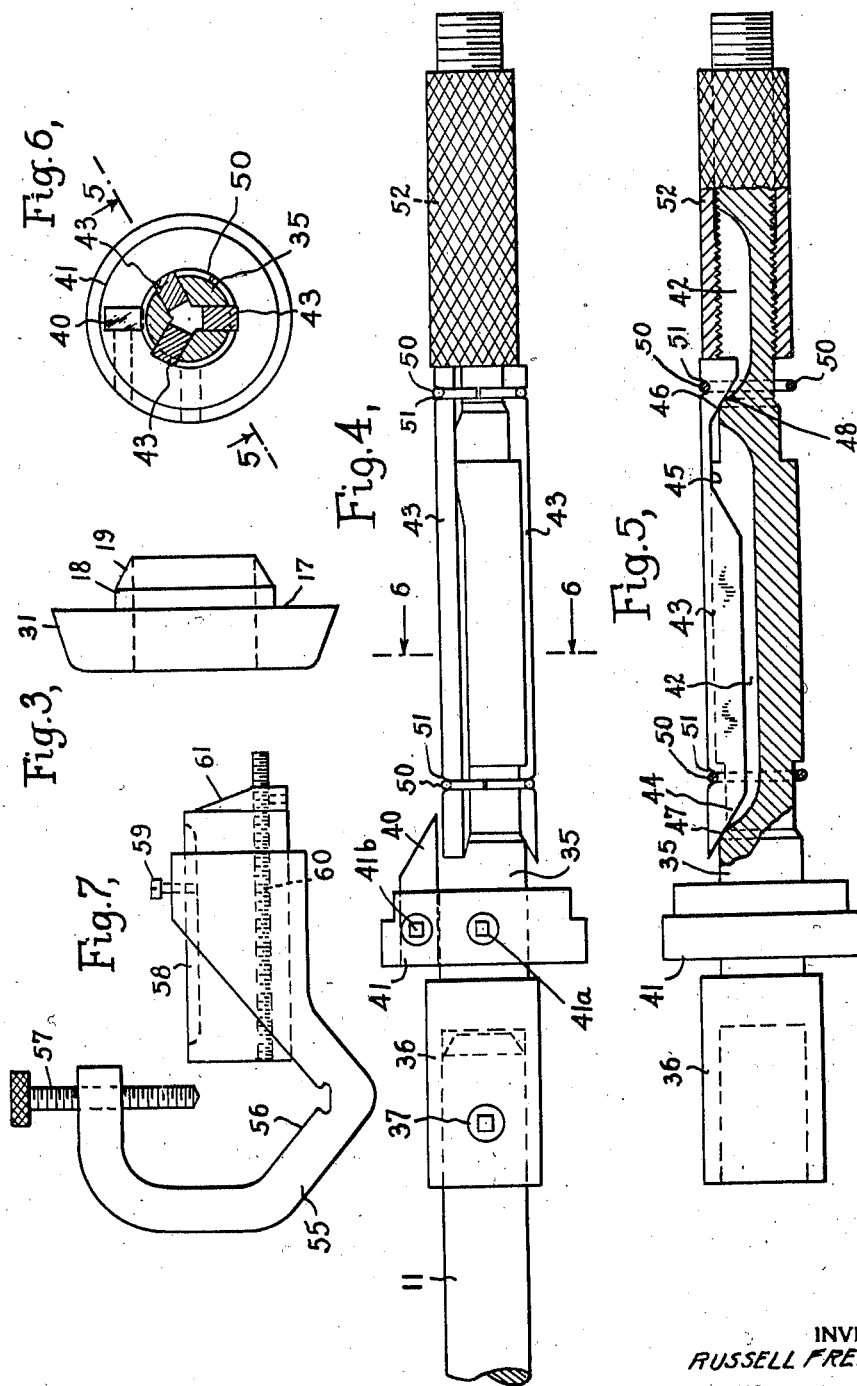
INVENTOR
RUSSELL FREMONT JAMES
BY
Pennie, Davis, Marvin & Edmonds
ATTORNEYS Patented Mar. 3, 1942

2,274,964

UNITED STATES PATENT OFFICE 2,274,964

APPARATUS AND METHOD FOR RESURFACING BEARINGS

Russell F. James, New Orleans, La.

Application December 15, 1936, Serial No. 115,918

14 Claims. (Cl. 77—2)

This invention relates to the resurfacing of bearings and has for its principal object the provision of inexpensive means for accurately resurfacing worn or scarred bearings. The invention particularly provides improved inexpensive means for resurfacing the wrist pin bearings of pistons for internal combustion engines but is not limited to use for that one purpose.

When a bearing has been in use for a considerable length of time, it becomes enlarged by wear. In resurfacing a worn bearing, the bearing should be restored to a truly circular cross section; scars should, if possible, be removed, and the repaired bearing should be as little larger than the original bearing as possible so that it will accommodate a pin that, although oversize, is as nearly the same size as the original pin as possible. Consequently, the resurfacing operation should be so conducted as to remove a minimum of metal from the bearing, but so as to remove it from the entire bearing area.

The resurfacing of any bearing is not a simple task if the above requirements are to be met but in resurfacing the wrist pin bearings of a piston for an internal combustion engine, a further special problem is involved. This is owing to the fact that such bearings are in fact composed of two separate bearings, one on each side of the piston. These separate bearings must be of the same diameter in order to accommodate the single wrist pin, and each must be centered about the same axis so that the wrist pin may turn easily in the bearing.

Until recently the common method of resurfacing wrist pin bearings has been to ream out the bearing with special reamers. Reamers have not been satisfactory because during the reaming operation they chatter and gouge out excess metal, and moreover the reamers require frequent sharpening. More recently hones, making use of abrasive stone or paper, have been employed. The hones give a better surface to the bearing, but it is practically impossible to hone a bearing uniformly to the correct diameter or uniformly throughout the length of the bearing. Neither of these methods is capable of restoring a worn bearing to a true circular cross section.

It has been recognized that the most satisfactory method of resurfacing wrist pin and other bearings, and the only method fully meeting the requirements outlined above, is by a boring operation, and most large machine shops having considerable resurfacing of this sort make use of expensive boring tools. Heretofore no simple and inexpensive means for accomplishing this result has been made available.

The present invention provides simple and inexpensive means for resurfacing bearings by a boring operation, in which the bearing is very accurately aligned with respect to the resurfacing tool. In carrying out the invention, the edges of the bearing to be resurfaced are first chamfered while the bearing is accurately centered about its axis, so that the chamfers are formed coaxially with the bearing. The bearing is then supported by means of these chamfered edges on a work-holding frame having conical work-engaging parts that are coaxial with a spindle carrying a suitable resurfacing tool. Thus the axis of the spindle coincides with the axis of the bearing, and upon relative axial movement between the tool and the work a thin layer can be removed from the bearing.

Briefly, the general organization of the resurfacing mechanism of the invention comprises a spindle, preferably driven by an electric motor, upon which is mounted a tool (cutter) for effecting the resurfacing of a bearing. A workholding assembly is provided to hold the piston or other piece of work with the spindle extending through the bearings to be resurfaced. This work-holding assembly comprises a pair of opposed annular work-supporting members having external conical surfaces (hereinafter referred to as "cones") which engage the previously formed chamfered or bevelled edges of the bearing to be resurfaced and thus support the bearing in accurately centered alignment about the spindle. The spindle is mounted in the same work-holding assembly on an axis that coincides with the axis of the cones. As a result, the bearing is held with its axis coincident with the axis of the spindle, because the chamfers on the bearing are themselves formed with their common axis coincident with the bearing axis.

The cones are mounted in the work-holding assembly so that they can be moved away from or toward each other along the axis of the spindle in order to accommodate differently sized pieces of work and so that the work may be inserted and clamped between them. To this end, the preferred work-holding assembly of the invention comprises a frame having one of the cones mounted at one side and an extensible sleeve at the opposite side in which the other of the cones is mounted. The spindle turns in two or more bearings, one or more of which is mounted in the work-holding frame behind the cone mounted therein while one or more is mounted in the extensible sleeve behind the other cone. The spindle passes axially through the sleeve and the cone carried by it and through the cone carried by the frame proper. The sleeve extends through a suitable opening in the frame and is so arranged with respect to the frame that it may be moved into and out of the frame, thus moving the cone that it carries toward or away from the cone carried by the frame, or be locked to the frame so that the two pieces constitute a unit.

Provision is made for moving the work-holding assembly relatively to the spindle along the axis of the spindle to effect the cutting. In the preferred form of the apparatus, this is accomplished by a screw feed mechanism mounted on the base of the work-holding assembly.

The invention will be better understood from the following description, considered in connection with the accompanying drawings, which show a preferred form of the invention and in which Fig. 1 is a plan view of apparatus for resurfacing bearings in accordance with the invention;

Fig. 2 is a longitudinal section through the apparatus shown in Fig. 1;

Fig. 3 is a side view of a conically surfaced work-supporter, or "cone";

Fig. 4 is a plan view of apparatus for use in chamfering a bearing preparatory to the actual resurfacing operation;

Fig. 5 is a section through the apparatus shown in Fig. 4, taken substantially along the line 5—5 of Fig. 6;

Fig. 6 is a section taken along the line 6—6 of Fig. 4; and

Fig. 7 is a view of a gauging tool for use in setting the resurfacing cutter to a proper adjustment.

The apparatus shown in Figs. 1 and 2 comprises a motor 10 to which a spindle 11 is connected by a coupling 12. The spindle 11 carries an adjustably mounted resurfacing tool or cutter 13 which is rotated with the spindle by the motor 10 during a resurfacing operation and which serves to cut fresh surfaces on the bearing. This is what is known as a fly cutter. It is intended for relatively high speed cutting in which the tool travels axially along the work (or the work along the spindle) as the cutter rotates. While this type of cutter has been known, there has been no satisfactory machine, to my knowledge, making its advantages available for the resurfacing work mentioned above.

The work-holding assembly consists of a frame 14 (Figs. 1 and 2) preferably of annular shape, which is large enough to receive the work P within it while still leaving ample free space around the work. At one side of this frame there is a boss 15 having a circular opening to receive one of the bearings 16 for the spindle 11. The inner part of this opening is flared to receive a work engaging member 17 (here referred to as a "cone") the outer surface of which is beveled to fit snugly in the recess formed by this flared opening. This gives a firm mounting but permits easy removal. The work-engaging part of this removable member (Fig. 3) consists of an annular extension 18 at one side having a conical outer surface 19 to engage the previously chamfered edge of a bearing to be resurfaced, as hereinafter described. This work-engaging member 17 has a central opening to permit passage of the spindle 11, the opening being large enough to clear the cutter 13 as shown.

At the opposite side of the frame 14 is a larger boss 20 having a circular opening to receive a sleeve 21 which forms, in effect, an extensible portion of the work-holder. This boss 20 is split at one side and is provided with a clamping screw 22 threaded into the split parts of the boss whereby the sleeve 21 may be clamped in any desired position. Within the sleeve 21, near its inner end, is mounted another spindle bearing 23. The inner end of the sleeve is flared to form a socket in a manner corresponding to that described above in connection with the opposite boss 15, and for the same purpose of receiving a second removable work-engaging member 17', adapted to engage the opposite edge of the bearing to be resurfaced in manner similar to that described in connection with the above-mentioned work-engager 17.

The provision of the sleeve 21, forming an extensible portion of the work-holder, serves two purposes. It enables the frame 14 to be moved to separate the work-engaging members 17, 17' so that the work, here illustrated as a piston P having two wrist pin bearings to be resurfaced, may be mounted in the work-holder. It also enables the unit to accommodate work of different sizes.

To mount the work in the work-holder, the sleeve 21 is clamped to the spindle by means of a clamping screw 24 which extends through a bushing 25 at one end of the sleeve. The frame 14 is then removed from the spindle. The work is then inserted in the opening in the frame 14 with one edge of the bearing in position against the work-holder 17 carried by the frame, and the work and work-holder are then slipped along the spindle until the boss 20 comes into position on the sleeve 21 and the other edge of the bearing is brought into engagement with the other work-engager 17' mounted in the sleeve 21. The frame is then clamped to the sleeve 21 by means of the clamping screw 22 and the other clamping screw 24 is released so that the spindle can turn freely in the bearings 16, 23.

The spindle 11, which carries the resurfacing tool or cutter 13, turns in the two spindle bearings 16 and 23 mounted in this work-holder. The cutter is radially adjustable with respect to the spindle and is secured thereto by a set screw 26. The spindle is connected to the electric motor 10 that is pivotally mounted on a base 27 by means of two upright members 28, located near the spindle end of the motor, to which are pivotally connected two horizontal members 29 secured to the sides of the motor housing. This mounting is such that when the work-holding assembly is not in place upon the spindle, the weight of the motor causes the spindle to tilt upwardly to facilitate the placing of the work-holding frame 14 in position on the spindle. When the frame is arranged on the spindle, the motor is overbalanced and the spindle tilts down until supporting lugs 30 on the work-holding frame 14 rest on the side rails of the base 27.

An especially useful feature of this invention is the provision of the removable work-engaging members 17, 17' which are mounted in the work-holding frame as described above. Each of these (Fig. 3) consists of a ring of metal beveled on its outer rim 31 to permit placement in the similarly beveled recesses of the boss 15 and the sleeve 21, respectively. Each has on its side face an extension 18 which is beveled on its outer side 19 to form a cone designed to engage a specially formed chamfer at the edge of the bearing to be resurfaced. It is desirable to provide a number of pairs of these "cones" differing in respect to the diameter of the conical extensions in order that they may fit bearings of different size. The several pairs of "cones" are all, however, identical in respect to the size of their outer bevels 31, so that all may fit the recesses in the work-holding frame and thus be interchangeable. The central openings in these "cones" are of larger size than the bearings with which they are adapted to be used. The purpose of this is to permit the cutter 13 on the spindle 11 to clear the inner wall of this opening when the work-holding assembly is moved along the spindle in the course of the resurfacing operation.

With work mounted between the cones 17, 17' and held by them in accurate alignment about the spindle 11, the entire work-holding assembly is moved as a unit relatively to the spindle along the axis thereof to enable the cutter 13 to traverse the work. Means for accomplishing this comprise a feed screw 32 on the base 30 and a cooperating follower 33 suitably secured to the work-holding frame 14. A U-shaped recess is formed in the lower end of the feeder arm, and this recess is provided with threads, or itself forms a part of a thread, corresponding to and adapted to engage with the threads of the feed screw 32. The threaded recess at the lower end of the follower 33 forms in effect a half-nut which is disengaged from the feed screw 32 when the whole work assembly is tilted upwardly. A crank 34 is provided to turn the feed screw 32, and with the follower 33 in engagement with the feed screw, turning the crank causes the frame 14 and its associated members of the work-holding assembly to move axially along the spindle. This causes the resurfacing cutter 13 to traverse the work, thereby effecting the resurfacing operation.

Before a bearing may be mounted for resurfacing on the above-described apapratus, its edges should be chamfered to engage with the cones 17, 17', and the chamfers should be on circles having their center at the axis of the bearing. The invention provides means in the form of an expanding mandrel (Figs. 4 to 6) for thus preparing a bearing to be resurfaced. The mandrel 35 is provided at one end with a socket 36 adapted to fit over the end of any suitable rotatable shaft, advantageously the spindle 11 driven by the motor 10, to which it may be secured by a set screw 37.

A chamfering cutter 40 is secured to the mandrel 35 by a suitable mounting comprising a ring 41 which fits closely about the mandrel 35 and to which it is locked by a set screw 41a. The chamfering cutter 40 fits within a recess in the ring 41, where it is held in place by a second set screw 41b. This mounting holds the cutter 40 securely to the mandrel, but is such as to permit detaching the cutter for sharpening or replacement by a new cutter. The angle between the cutting edge of the chamfering cutter 40 and the axis of the mandrel is substantially the same as the angle formed between the conical work-supporting surfaces 19 of the cones 17, 17' and the axis of the spindle, so that chamfers which are cut by the chamfering cutter 40 at the edges of a bearing to be resurfaced will fit closely about the conical surfaces of the cones.

In employing the mandrel to chamfer the edge of a bearing, the mandrel is slipped through the bearing and then, with the mandrel and the cutter rotating and with the bearing held stationary by hand or suitable mechanical appliance, the bearing is pushed against the chamfering cutter. If the chamfers thus cut at the edge of the bearing are to be in accurate centered alignment with the bearing axis, thereby to permit mounting the bearing in the resurfacing mechanism in accurately centered alignment about the spindle, the mandrel must fit the bearing closely. Since different bearings will differ in diameter, the mandrel is made so that it may be adjusted to fit bearings of different sizes.

For this purpose, the mandrel is formed with longitudinal recesses 42 adapted to receive blades 43. Each blade is formed with its forward end cut at an angle to provide a forward inclined surface 44. A notch 45 is formed at the rear of each blade on the underside thereof, and the rear edge of the notch is cut at the same angle as that of the forward inclined surfaces 44 to provide a rearward inclined surface 46 parallel to the forward inclined surface 44. Each blade 43 is supported on the mandrel 45 by means of these inclined surfaces 44 and 46, which bear against correspondingly inclined beveled surfaces 47 and 48, respectively, on the mandrel. If a blade 43, thus mounted, is pushed forward, it is caused to move up the beveled surfaces 47 and 48 of the mandrel and out from the axis of the mandrel, and if brought back, it slides down the beveled surfaces toward the axis of the mandrel. Generally, three blades 43 are mounted on the mandrel, and since the effective outside diameter of the mandrel depends on distance of the top edges of the blades from the axis of the mandrel, the effective diameter of the mandrel may be varied by varying the positions of the blades on the beveled surfaces 47 and 48 of the mandrel.

The outer or top edge of each blade 43 is rounded transversely so that it will not present sharp edges likely to damage the surfaces of bearings during the chamfering of the bearing edges.

To hold the blades on the mandrel, spring rings 50 received in notches 51 in the rounded top surfaces of the blades 43 are employed. The spring rings 50 tend to draw the blades as far as they will go down the beveled surfaces 47 and 48 of the mandrel. To hold the blades in the proper position, an internally threaded sleeve 52, knurled on its outer surface, fits over the end of the mandrel 35 in engagement with threads cut thereon. The forward end of the sleeve 52 bears against the rearward end of the blades 43, and by turning down the sleeve 52, the blades 43 are pushed up by the beveled surfaces 47 and 48. Conversely, by unscrewing the sleeve 52, the blades 43 are drawn down the beveled surfaces 47 and 48 by the spring rings 50. Thus the effective outside diameter of the mandrel may be adjusted simply by turning the sleeve 52 to the proper extent.

Before a bearing can be resurfaced by means of the resurfacing apparatus of the invention, the resurfacing cutter 13 on the spindle 11 must be adjusted to cut just the right amount of metal from the bearing. The invention contemplates the provision of a tool for making this adjustment quickly and accurately. This tool (Fig. 7) comprises a V-block 55, the V (56) of which is adapted to receive any cylindrical object such as an oversize wrist pin. A lock screw 57 is provided to clamp such an object in the V of the block. With a cylindrical object thus locked in the V, the axis of the object will lie in the plane bisecting the V. A gauge plunger 58 is mounted in the V-block 55 to operate along an axis normal to the plane bisecting the V of the block. With an oversize wrist pin locked in the V by the lock screw 57, the gauge plunger is pushed down until it just touches the wrist pin, and is there locked in place by a set screw 59. The lock screw 57 may then be loosened and the wrist pin removed. The setting of the gauge screw now corresponds to the radius of the wrist pin, because the perpendicular distance from the plane bisecting the V of the block (in which plane the axis of the pin lay) to the bottom of the gauge screw equals the radius of the wrist pin.

Without disturbing the setting of the gauge plunger, the V-block is now slipped over the spindle 11 with the bottom of the gauge plunger directly over the cutter 13, and the lock screw 57 is turned down to clamp the spindle 11 in the V of the block. The axis of the spindle now lies in the plane bisecting the V of the block. The cutter is adjusted in its mounting on the spindle until it touches the underside of the gauge plunger. Since in operation the cutter describes a circle having the axis of the spindle as its center, it is thus adjusted to make a cut of exactly the same radius as the wrist pin used in setting the gauge screw. After adjusting the cutter, the V-block is, of course, removed from the spindle.

In order to allow for setting the cutting tool to cut through a radius a little greater or a little less than the diameter of the wrist pin, thereby to allow for proper clearances, an adjustable screw 60 adapted to make contact with the cutting edge of the cutting tool extends through the plunger. An indicator hand 61 is provided at the top of the adjustable screw 60. By turning the adjustable screw 60 through a suitable angle as indicated by the hand 61, the cutting tool may be set to cut through a radius as much greater or as much less than the radius of the wrist pin used to set the plunger 57 as the bottom of the adjustable screw 60 extends above or below the bottom surface of the plunger.

In employing the apparatus described above to resurface bearings, say, for example, the wrist pin bearings of a piston to fit an over-size wrist pin, the mandrel 35 is first secured to the end of the spindle 11. The piston is then slipped over the mandrel until the wrist pin bearings lie over the blades 43 of the mandrel and the knurled sleeve 52 is screwed down until the blades 43 are snug within the bearing but not tight. The motor 10 is started, thereby rotating the mandrel, and the piston, manually held from rotating, is pushed against the cutter to chamfer one edge of the bearing. The motor is stopped and the piston is removed from the mandrel. The work is then reversed on the mandrel and the operation is repeated to chamfer the opposite bearing edge. The frame 15 is advantageously kept in place on the spindle throughout this operation to prevent the weight of the motor from tilting the spindle up. Since both chamfers are made with the piston on the same center, and since this center coincides with the center line of the bearings the chamfers are in accurate alignment with the axis of the V bearing.

The mandrel 35 is now detached from the spindle 11. The clamping screw 24 in the sleeve 21 is tightened to secure the sleeve to the spindle 11, and the clamping screw 22 is loosened. The spindle 11 and frame 14 are tilted to disengage the follower 33 from the feed screw 32 and the frame is then slipped off the end of the spindle. This operation is facilitated by the manner in which the mechanism is pivoted to the strut 28, for the motor 10 acts as a counterweight to help lift the shaft 11 and sleeve 21.

The cutting tool 13 is set to cut the proper amount of metal from the bearing to be resurfaced, advantageously with the aid of the V-block tool described above but, if desired, with any other accurate measuring instrument. A pair of cones 17, 17' of proper size are selected and seated one in the recess in the end of the sleeve 21 and the other in the recess in the frame 14. The frame 14 is then replaced over the spindle 11 with the piston positioned within it and with the spindle extending through the wrist pin bearings. The frame is lowered until the threads of the follower 33 engage the threads of the feed screws 32 and the lugs 30 of the frame rest on the sides of the channel 27. Next the feed screw is turned to advance the frame 14 axially along the sleeve 21 until the cones 17, 17' engage the chamfered edges of the wrist pin bearings to hold the piston securely with the wrist pin bearings in accurate alignment with the spindle 11 and the cutting tool 13 thereon. The clamping screw 22 is tightened to clamp the sleeve 21 and frame 14 together, and the clamping screw 24 is loosened. The motor 10 is then started to rotate the spindle 11 and cutting tool 13. The crank 34 is turned to advance the sleeve 21 and frame 14, with the piston held between them, along the spindle, thus enabling the cutter 13 to traverse the bearings to resurface them. When the resurfacing is complete, the motor is stopped, the clamping screw 24 is tightened, the clamping screw 22 is loosened, and the piston, with bearings resurfaced, is removed from the machine.

If a conventional electric motor operating at the usual rate of about 1800 R. P. M. is employed as the motor 10 to operate the apparatus, it may be advantageous to gear it down by as much as 5 to 1 to avoid the chattering that sometimes accompanies high speed cutting.

The mechanism of the invention is relatively inexpensive, and it permits of very accurate resurfacing of bearings, cutting clean surfaces and giving a resurfaced bearing having a uniform diameter throughout. The accuracy of the machine is enhanced by the fact that the spindle carrying the resurfacing tool is supported with respect to the bearing being resurfaced on both sides of the cut, and it is possible by the use of the invention to fit a wrist pin as little as 0.003 in. oversize in precise alignment with the original pin.

It is understood, of course, that various modifications may be made in the apparatus shown and described herein to adapt it to particular uses without departing from the invention.

I claim:

1. Apparatus for resurfacing bearings comprising a work holder having a conically surfaced projection for engaging the edge of a bearing to be resurfaced and a central opening in said projection, a fly cutter spindle coaxial with said conical surface extending through said opening, the opening being large enough to clear the cutter, and means permitting relative axial movement between the work holder and the spindle to bring the cutter through said opening into working engagement with the bearing to be resurfaced.

2. Apparatus for resurfacing bearings comprising a work holder having a socket for receiving a removable annular member which is provided with a central opening and a conically surfaced projection for engaging the edge of a bearing to be resurfaced, a cutter spindle co-axial with said conical surface extending through said opening, the opening being large enough to clear the cutter, and means permitting relative axial movement between the work holder and the spindle to bring the cutter through said opening into working engagement with the bearing to be resurfaced.

3. Apparatus for resurfacing bearings comprising a base, a motor and direct-connected cutter spindle, the motor being pivotally mounted on an axis at right angles to the spindle and tending to tilt said spindle upwardly, a work holder assembly through which said spindle extends, said assembly comprising a part which carries work engaging members and is removable to permit the mounting of the work in it, the arrangement being such that the spindle is tilted up except when said removable part of the work holder assembly is in place on said spindle.

4. In a machine for resurfacing bearings by effecting relative movement axially between the work and a rotary cutter spindle, the combination of a frame having oppositely located work supporting cones co-axial with the spindle to engage chamfered bearing edges at opposite sides of the work and central openings therein for the spindle large enough to clear the cutter, whereby the cones support the work during the cutting operation and permit cutting over the full bearing surface.

5. In a machine for resurfacing bearings by effecting relative movement axially between the work and a rotary cutter spindle, the combination of a frame having oppositely located work supporting cones co-axial with the spindle to engage chamfered bearing edges at opposite sides of the work and openings therein for the spindle large enough to clear the cutter, together with bearings for the spindle in said frame co-axial with the cones, whereby the cones support the work during the cutting operation and permit cutting over the full bearing surface.

6. In a machine for resurfacing bearings by effecting relative movement axially between the work and a rotary cutter spindle, the combination of a frame having removable oppositely located work supporting cones co-axial with the spindle to engage chamfered bearing edges at opposite sides of the work, said cones having central openings for the spindle large enough to clear the cutter, together with bearings for the spindle in said frame co-axial with the cones, whereby the cones support the work during the cutting operation and permit cutting over the full bearing surface.

7. In a machine for resurfacing bearings by effecting relative movement axially between the work and a rotary cutter spindle, the combination of a frame having oppositely located sockets for removable work supporting cones co-axial with the spindle and adapted to engage chamfered bearing edges at opposite sides of the work, said cones having central openings for the spindle large enough to clear the cutter, together with bearings for the spindle in said frame co-axial with the cones, whereby the cones support the work during the cutting operation and permit cutting over the full bearing surface.

8. In a machine for resurfacing bearings by effecting relative movement axially between the work and a rotary cutter spindle, the combination of a frame having oppositely located work supporting cones co-axial with the spindle to engage chamfered bearing edges at opposite sides of the work and central openings therein for the spindle large enough to clear the cutter, the said frame consisting of two parts, each carrying one of said cones, said parts being relatively movable with respect to each other and releasably secured together to permit said cones to be brought into and held in engagement with the work, together with bearings for the spindle in said frame co-axial with the cones, whereby the cones support the work during the cutting operation and permit cutting over the full bearing surface.

9. In a machine for resurfacing bearings by effecting relative movement axially between the work and a rotary cutter spindle, the combination of a frame having oppositely located work supporting cones to engage chamfered bearing edges at opposite sides of the work and central openings for the spindle large enough to clear the cutter, the said frame consisting of two parts releasably secured together, one carrying one of said cones and having an opening at the opposite side and the other carrying the other cone and being in the form of a sleeve fitting said side opening to permit relative movement for bringing the cones into engagement with the work, together with bearings for the spindle in said frame co-axial with the cones, whereby the cones support the work during the cutting operation and permit cutting over the full bearing surface.

10. A machine for resurfacing bearings comprising a base, a motor and rotary cutter spindle mounted on said base, and a work supporting frame movable on said base along said spindle and having openings for said spindle large enough to clear the cutter, said frame comprising bearings for said spindle and oppositely located cones to engage chamfered bearing edges at opposite sides of the work, the bearings and cones being co-axial with the spindle.

11. In resurfacing a bearing, the method which comprises preliminarily cutting a chamfer at the edge of the bearing by rotating the chamfering cutter on an axis aligned with the bearing axis, then mounting the bearing on supports which engage said chamfers and are co-axial with the spindle of a rotary resurfacing cutter, whereby to locate the bearing in co-axial relation with the cutter, and causing relative axial movement between the rotary cutter and the bearing to effect the resurfacing cut.

12. In resurfacing the wrist pin bearings of a piston, the method which comprises preliminarily cutting a chamfer at the outer edge of each bearing by rotating the chamfering cutter about an axis aligned with the bearing axis, then mounting the piston on supports which engage said chamfers and are coaxial with the spindle of a rotary resurfacing cutter, whereby to locate the bearings in co-axial relation with the cutter, and causing relative axial movement between the rotary cutter and the piston to effect the resurfacing cut.

13. Apparatus for resurfacing a bearing comprising a rotary spindle for the resurfacing tool, a mandrel adapted to be connected to said spindle to turn therewith on the same axis, a chamfering tool on said mandrel to cut a chamfer at the edge of a bearing non-rotatably mounted on said mandrel and thereby located with its axis aligned with that of said tool, and a work holding assembly comprising supporting members co-axial with the spindle and adapted to engage said chamfers to support the bearing in co-axial relation about the spindle axis, and means for causing relative axial movement between the bearing and the resurfacing tool to effect the resurfacing cut.

14. The apparatus of claim 13 in which the mandrel comprises radially expansible blades for engaging the inner wall of the bearing to locate it with its axis aligned with that of the mandrel and co-axial spindle.

RUSSELL F. JAMES.